United States Patent [19]

Koleske et al.

[11] 4,086,294

[45] Apr. 25, 1978

[54] POLYCAPROLACTONE-EPOXIDE ADDUCTS AND COATING COMPOSITIONS THEREOF

[75] Inventors: Joseph Victor Koleske, Charleston; Oliver Wendell Smith, South Charleston, both of W. Va.

[73] Assignee: Union Carbide Corporation, New York, N.Y.

[21] Appl. No.: 690,283

[22] Filed: May 26, 1976

[51] Int. Cl.$^2$ .................... C08G 63/76; C08G 63/02; C08L 67/04
[52] U.S. Cl. ................. 260/834; 260/29.2 EP; 260/29.2 E; 260/78.3 R; 560/180
[58] Field of Search ...... 260/78.3 R, 830 R, 29.2 EP, 260/834, 484 A, 29.2 E

[56] References Cited

U.S. PATENT DOCUMENTS

| | | | |
|---|---|---|---|
| 3,408,421 | 10/1968 | Kurka | 260/830 |
| 3,576,903 | 4/1971 | Groff | 260/824 |
| 3,723,569 | 3/1973 | Hoeschle | 260/835 |
| 3,896,303 | 7/1975 | Gerkin et al. | 260/78.3 R |

OTHER PUBLICATIONS

Noshay et al., "Epoxy/Modifier Block Copolymers", J. Poly. Sci.; Poly. Chem. 12 (3), 689-705 (1974).

*Primary Examiner*—Harold D. Anderson
*Assistant Examiner*—E. A. Nielsen
*Attorney, Agent, or Firm*—Francis M. Fazio

[57] ABSTRACT

Water insoluble polycaprolactone-epoxide adducts are produced comprising the reaction product of a polycaprolactone polyol, a diepoxide and an anhydride of a polycarboxylic acid. The polycaprolactone polyol reacted with the diepoxide and the anhydride of the polycarboxylic acid has at least two hydroxyl groups in the molecule, a hydroxyl number of from about 15 to about 600 and an average molecular weight of from about 290 to about 6,000. The carboxylic acid anhydride has at least one intramolecular carboxylic anhydride group. These water insoluble polycaprolactone-epoxide adducts on reaction with an inorganic or organic base produce water soluble, carboxyl modifier polycaprolactone-epoxide oligomer addition reaction products which are eminently suitable for the production of aqueous coatings compositions. Exceptionally good coatings compositions are obtained when a crosslinker is present in the coating composition.

56 Claims, No Drawings

POLYCAPROLACTONE-EPOXIDE ADDUCTS AND COATING COMPOSITIONS THEREOF

BACKGROUND OF THE INVENTION

Governmental regulations have placed ever increasing restrictions on the amounts and type of organic volatiles permitted to escape into the atmosphere from coatings compositions. Considerable efforts have been expended to develop coatings compositions having a minimal amount of volatile organic components and this has led to development of powder coatings, radiation curable coating and water borne coatings. In these recent developments the amounts of organic solvents present are minimal and consequently there is little or no atmospheric pollution.

A particularly well known resin used in the coatings industry is the class of resins derived from epsilon-caprolactone. These polycaprolactone polyol derivatives produce coating materials of exceptional and desirable properties. However, as in all major instances in the past, they have generally been applied from organic solvent solutions. Any discovery which would eliminate the organic solvent would be of great importance in the coatings industry which depends upon these materials in many manufacturing or coating operations. Consequently, any discovery, such as the one which is hereinafter described, which would serve to lower atmospheric pollution and still produce a good satisfactory coating composition would be of great importance.

SUMMARY OF THE INVENTION

It has now been found that water soluble polycaprolactone-epoxide adducts can be prepared that can be used for the production of water borne coatings compositions. These water soluble polycaprolactone-epoxide adducts are obtained by reacting a polycaprolactone polyol, a diepoxide and an anhydride of a polycarboxylic acid to produce a modified polycaprolactone-epoxide adduct which is generally water insoluble. This polycaprolactone-epoxide adduct is converted to the water soluble form by reaction with an inorganic or organic base. The water soluble carboxyl modified polycaprolactone-epoxide oligomer addition reaction products resulting are then formulated into coatings compositions. The preferred coatings compositions are those that additionally contain a crosslinker. The aqueous coatings compositions are applied in conventional manner and thermally cured to dry film coatings.

DESCRIPTION OF THE INVENTION

The carboxyl modified polycaprolactone-epoxide adducts or derivatives that are eventually used to produce the coatings compositions are the adducts comprising the reaction product of a polycaprolactone polyol, a diepoxide and an anhydride of a polycarboxylic acid which mixture of reaction products has subsequently been converted to a water soluble form by reaction with a base. As starting materials for producing the adducts one can use any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The polyols for use herein can be single compounds or mixtures of compounds and either can be used in this invention. The method for producing the polycaprolactone polyols is of no consequence and the organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene-glycols), and similar polyalkylene glycols, either blocked, capped or heteric, containing up to about 40 or more alkyleneoxy units in the molecule, 3-methyl-1-5-pentanediol, cyclohexanediol, 4,4'-methylene-bis-cyclohexanol, 4,4'-isopropylidene bis-cyclohexanol, xylenediol, 2-(4-hydroxymethylphenyl) ethanol, 1,4-butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis-(2-hydroxyethyl)ethylene diamine, and the like.

When the organic functional initiator is reacted with the caprolactone a reaction occurs that can be represented in its simplest form by the equation:

R''(OH)$_x$ + O=C(CR'$_2$)$_4$CHR'—O⎦ ⟶

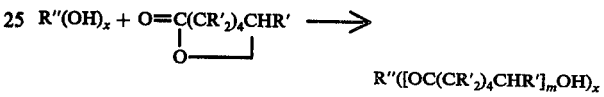

In this equation the organic functional initiator is the R''—(OH)$_x$ compound and the caprolactone is the

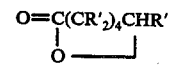

compound; this can be caprolactone itself or a substituted caprolactone wherein R' is an alkyl, alkoxy, aryl, cycloalkyl, alkaryl or aralkyl group having up to 12 carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to 1,000. The most preferred are the polycaprolactone diol compounds having an average molecular weight of from about 290 to about 500 and the polycaprolactone triol compounds having an average molecular weight of from about 300 to about 1,000; these are most preferred because of their low viscosity properties. In the formula $m$ is an integer representing the average number of repeating units needed to produce the compound having said molecular weights. The average hydroxyl number of the polycaprolactone polyol can be from about 15 to 600, preferably from 200 to 500; and the polycaprolactone polyol can have an average of from 2 to 6, preferably 2 to 4, hydroxyl groups.

Illustrative of polycaprolactone polyols that can be used as starting materials in this invention one can mention the reaction products of a polyhydroxyl compound having an average from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

trative diepoxides disclosed therein one can mention 3,4-epoxycyclohexylmethyl-3,4-epoxycyclohexane carboxylate, bis(3,4-epoxy-6-methylcyclohexyl-methyl)adipate, bis(2,3-epoxycyclopentyl)ether, vinyl cyclohexene dioxide, 2-(3,4-epoxycyclohexyl)-5,5-spiro-(2,3-epoxycyclohexene)-m-dioxane, bis(3,4-epoxycyclohexylmethyl)adipate, and the like.

The amount of diepoxide charged to the reaction can vary from about 0.2 mole per mole of polycaprolactone

POLYCAPROLACTONE POLYOLS

| | Initiator | Average MW of polyol | Average No. of CPL Units in molecules |
|---|---|---|---|
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalene glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 2,000 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4. |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

* = Average molecular weight of glycol.

The structures of the compounds in the above tabulation are obvious to one skilled in the art based on the information given. The structure of compound No. 7 is:

wherein the variable $r$ is an integer, the sum of $r + r$ has an average value of 3.7 and the average molecular weight is 527. The structure compound No. 20 is:

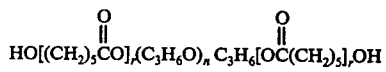

wherein the sum of $r + r$ has an average value of 6 and the average molecular weight is 1,684. This explanation makes explicit the structural formulas of compounds 1 to 34 set forth above.

The diepoxides that can be used in this invention are well known to those skilled in the art and are fully described in U.S. Pat. No. 3,027,357, U.S. Pat. No. 2,890,194 and U.S. Pat. No. 2,890,197. Of particular interest is that portion of U.S. Pat. No. 3,027,357 beginning at column 4, line 11 to column 7, line 38, which portion and disclosure is specifically incorporated herein by reference. Among some of the specific illuspolyol initially charged to the reaction, regardless of the reaction sequence used, to as high as one mole of diepoxide per mole of polycaprolactone polyol. Preferably it is from about 0.3 to 0.6 mole of diepoxide per mole of polycaprolactone polyol initially charged.

Illustrative of the carboxylic acid anhydrides that can be used one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

The amount of polycarboxylic acid anhydride reacted with the polycaprolactone polyol is an amount which is insufficient to react with all of the hydroxyl groups initially present in the polycaprolactone polyol or formed in the polycaprolactone-epoxide adduct. The amount will vary and can be from 0.1 to about 0.5 anhydride equivalent for each unreacted hydroxyl equivalent or group present in the polycaprolactone portion of the reaction mixture.

The reactions are conducted at a temperature of from about 75° to 200° C., preferably from about 100° to 160° C. The time required for reaction will vary depending upon the particular reactants charged, the temperature and the batch size of the reaction mixture, facts which are well known to those skilled in the art. Generally it has been found that a reaction period in the laboratory of from 15 to 120 minutes at from about 125° to 175° C. is adequate to produce the initial water insoluble carboxyl modified polycaprolactone-epoxide oligomer addition reaction product obtained by the reaction of the intermediates.

The water insoluble polycaprolactone-epoxide adduct formed at this stage of the reaction is a viscous liquid in most instances. However, in some instances the product may solidify upon standing for an extended period of time. This, however, does not detract from its further utility. Generally these modified polycaprolactone-epoxide oligomers or adducts are water insoluble but solvent soluble.

The water insoluble polycaprolactone-epoxide adducts described above are converted to water soluble form by reaction with a base which can be either an inorganic or an organic base. The preferred bases are the organic amines. The bases that can be used are well known to those skilled in the art and any of the known bases can be used. Illustrative thereof one can mention ammonia, butylamine, morpholine, piperazine, triethylamine, N-methyl diethanolamine, N,N,-diethyl ethanolamine, N,N-dimethyl propanolamine, triethanolamine, diethylamine, triisopropanolamine, monoethanolamine, diethanolamine, mono-isopropylamine, diisopropanolamine, 2-amino-2-methyl-1-propanolamine, and the like. While any amine can be used, the preferred are the tertiary amines.

The amount of amine or base added is an amount sufficient to neutralize essentially all of the free carboxylic groups in the water insoluble adduct and to take the pH of the reaction mixture to about 6 to 10, preferably 7 to 9.

Reaction with the amine products a polycaprolactone-epoxide product or adduct which is predominantly water soluble. This water soluble adduct is eminently suitable for the production of a water borne coating composition. While applicants have not fully established the structures of the adducts present in their reaction product mixture, it has been theorized that the reaction can proceed along the following routes; however, the reaction product is a complex mixture of components.

ROUTE 1
Step 1

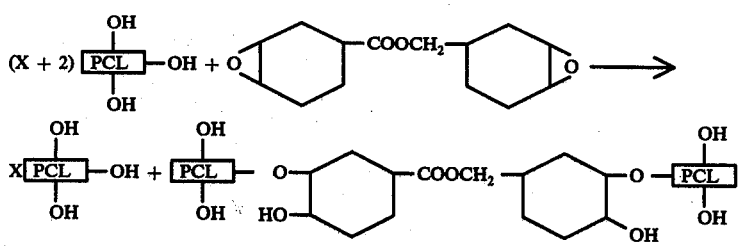

Water Insoluble Polycaprolactone-Epoxide I
Step 2

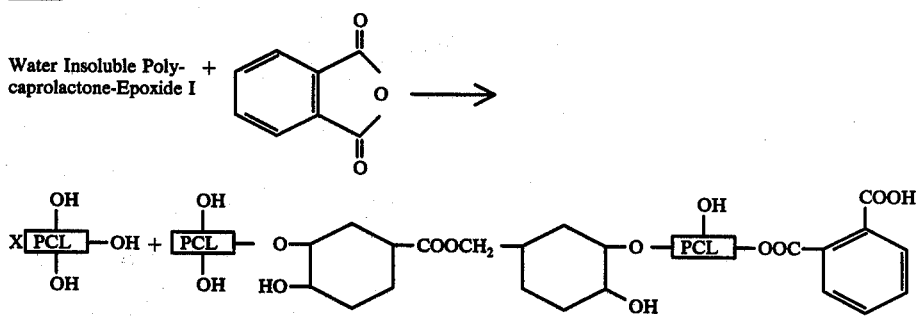

Water Insoluble Polycaprolactone-Epoxide II
Step 3

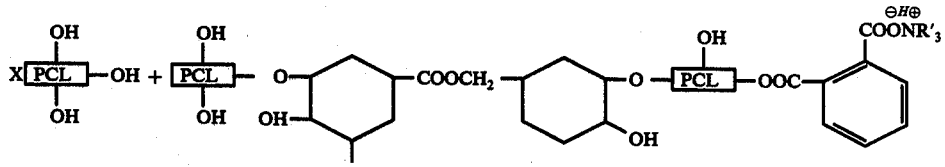

Water Soluble Polycaprolactone-Epoxide Adduct
ROUTE 2
Step 1

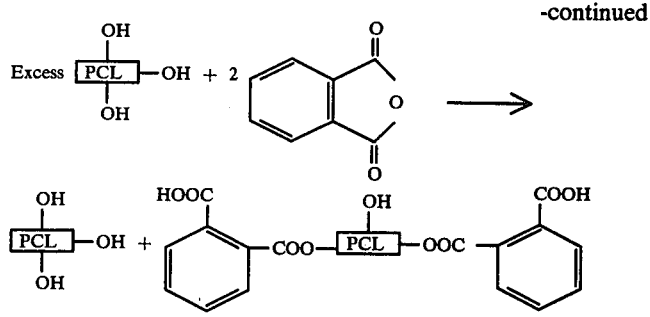

Water Insoluble Polycaprolactone Adduct
Step 2

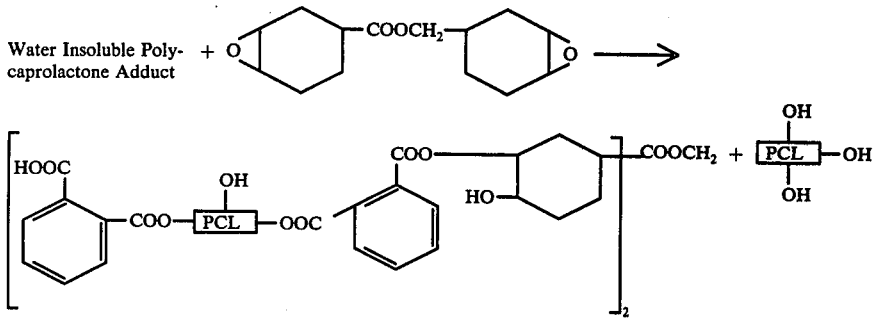

Water Insoluble Polycaprolactone-Epoxide I
Step 3

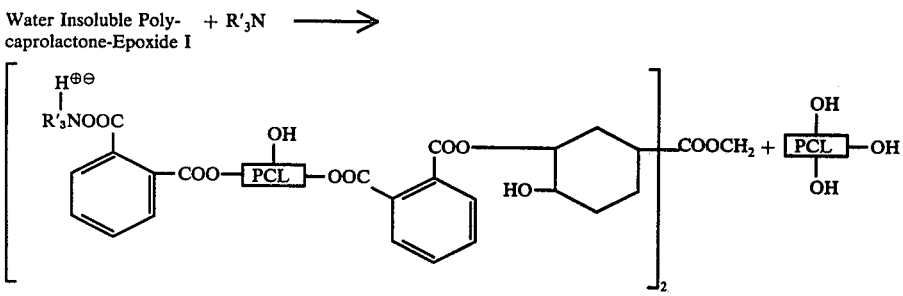

Water Soluble Polycaprolactone-Epoxide
In the above, the unit OH represents a

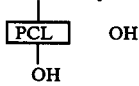

polycaprolactone triol, X is an integer having a value of from 0 to 4 and R'₃N represents a tertiary amine. In some instances, depending upon the amount of anhydride used in the reaction, the amount of water used to dissolve the final neutralized product may be restricted before evidence of insolubilization is noted. While this theoretical explanation is presented, applicants do not intend to be bound by any theory.

In a typical embodiment according to Route 1, one can react the polycaprolactone polyol with the diepoxide at the indicated temperature to produce the Water Insoluble Polycaprolactone-Epoxide I or variants thereof. In some instances one may wish to react up to two of the hydroxyl on each polycaprolactone triol. This intermediate compound is then reacted in Step 2 with a carboxylic acid anhydride to form the second Water Insoluble Polycaprolactone-Epoxide II shown above. Finally, this latter compound is reacted with an amine in Step 3 to yield the Water Soluble Polycaprolactone-Epoxide Adduct shown.

In a typical embodiment according to Route 2, one can initially react the polycaprolactone polyol with a carboxylic acid anhydride to obtain the Water Insoluble Polycaprolactone Adduct shown in Step 1. This derivative is then reacted, as shown in Step 2, with the diepoxide to produce the Water Insoluble Polycaprolactone-Epoxide Adduct I. Finally, this latter compound is reacted with an amine in Step 3 to produce the Water Soluble Polycaprolactone-Epoxide.

In the schematics shown above specific ratios and compounds were employed for illustrative purposes only. It is apparent, in view of our complete description, that these can be modified within the ranges disclosed in this application.

As is known, catalysts are used during the reaction of the diepoxide with the carboxyl group. The suitable catalysts for use in this invention are those conventionally used and the amounts are also known to those skilled in the art. Illustrative thereof one can mention stannous octoate, benzildimethylamine, tris(dimethylaminomethyl)phenol, triethylenediamine, tributylphosphine, triethylamine, uranyl nitrate hexahydrate, and the like.

The water soluble polycaprolactone-epoxide derivatives or adducts prepared above can be used to produce coating compositions. They can also be modified in known manner by the addition of pigments, fillers and other additives conventionally added to coating compositions. In any instance they are applied to a surface by conventional means and then thermally cured either alone or in the presence of a crosslinker. It is preferred, however to have a crosslinker present and in the such instances the known catalyst for expediting the crosslinking reaction are generally added. The particular pigment or colorants added to the coating compositions are immaterial and any of the known conventional ones can be used. The amount of crosslinker present in the coating composition can vary from 25 to 200 weight percent preferably 50 to 100 weight percent, based on the weight of the water soluble polycaprolactone-epoxide adduct. Among the suitable crosslinkers are the urea formaldehyde aminoplasts, the hexamethoxymethyl melamines, and the known water dispersible transethers thereof with lower alkanols, benzoguanamine, acrylamide resins, as well as any of the other well known crosslinkers of the amine type.

Catalysts are generally present to catalyze a melamine or amine cure system and these are also well known. Among the common catalysts are the mineral acids such as hydrochloric acid or sulphuric acid, paratoluene sulphonic acid, dodecylbenzene sulphonic acid, phosphoric acid, maleic acid, trimelletic acid, phthalic acid, succinic acid, and the like. Also useful are the half esters of said acids. It is known that the stronger the acidity, the better the catalytic activity.

The coating compositions are applied to a substrate by the known conventional methods. They are cured by heating at a temperature of about 125° To 250° C., preferably from 150° to 200° C. for a period of time sufficient to obtain a dry film. Generally, this time will range from about one to 30 minutes, preferably from 10 to 20 minutes. The components present in a particular coating composition used will determine the temperature and time that will be required to obtain an adequate cure and a good film coating.

The coatings compositions of this invention are generally high solids coatings compositions and they can contain as much as about 80 weight percent solids therein. Generally the total solids content of the coatings compositions of this invention range from about 30 to 70 weight percent of the total weight of the composition.

The coatings compositions were evaluated according to the following procedures. Crosshatch adhesion refers to a test using 10 parallel single edge razor blades to scribe test films with 2 sets of perpendicular lines on a cross-hatch pattern. Ratings are based on the amount of film removed after applying and subsequently pulling a contact adhesive tape (Scotch Brand 606) away from the surface of the scribed coating at a 90° angle in a fast rapid movement. It is important to carefully apply and press the tape to the scribed coating to eliminate air bubbles and provide a good bond because adhesion is reported in percent of film remaining on the substrate with a 100 percent rating indicating complete adhesion of the film to the substrate.

Solvent resistance is a measure of the resistance of the cured film to attack by acetone and is reported in the number of rubs or cycles of acetone soaked cheesecloth required to remove one half of a film from the test area. The test is performed by stroking the film with an acetone soaked cheesecloth until that amount of film coating is removed. The number of cycles required to remove this amount of coating is a measure of the coating solvent resistance.

Reverse impact measures the ability of a given film to resist rupture from a falling weight. A Gardner Impact Tester using an 8 pound dart is used to test the films cast and cured on the steel panel. The dart is raised to a given height in inches and dropped on to the reverse side of a coated metal panel. The inches times pounds, dsignated inch-pound, absorbed by the film without rupturing is recorded as the films reverse-impact resistance.

In this application the following definitions describe the particular compounds that are used in the examples:

Silicone Surfactant I is

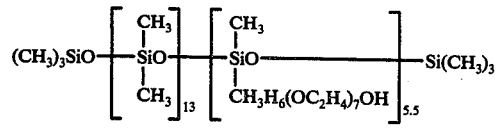

Polyol B is a polycaprolactone triol having an average molecular weight of 540 and an average hydroxyl number of 310.

Polyol C is a polycaprolactone triol having an average molecular weight of 300 and an average hydroxyl number of 560.

The following examples further serve to define this invention.

EXAMPLE 1

A mixture of 5,510 grams of Polyol C, 9,974 grams of Polyol B and 2,516 grams of 3,4-epoxycyclohexylmethyl-3,4-epoxycyclohexane carboxylate were charged to a reaction kettle. This mixture was heated to 100° C. and 150 ppm stannous octoate catalyst was added. The temperature was raised to 150° C. and the mixture stirred at that temperature for 18 hours to completion of the reaction. Analysis of the polyol product produced indicated a hydroxyl number of 343, a water content of 0.03 weight percent and 0.13 residual unreacted epoxy.

A 280 gram portion of the above adduct was reacted with 70 grams of phthalic anhydride under an inert gas atmosphere for 30 minutes at 130° C. This polycaprolactone-epoxide adduct was also water insoluble, had an RVT Brookfield viscosity of 314,000 cps. at 25° C. using a No. 6 spindle at 1 rpm and an acid number of 76.

EXAMPLE 2

A coating composition was produced containing 20 grams of the water insoluble polycaprolactone-epoxide adduct of Example 1, 10 grams of hexamethoxymethylmelamine containing about 1.5 weight percent methylol group, 2.7 grams of dimethyl ethanolamine, 0.02 gram of Silicone Surfactant I, and 25 grams of water. A clear water soluble coating was produced which was cast on steel panels and cured at 350° F. for 10 minutes. The resulting film had a reverse impact of 50 in./lb., excellent crosshatch adhesion, pencil hardness of 3H and excellent resistance to acetone solvent.

EXAMPLE 3

A 297.5 grams portion of the water insoluble reaction product produced in the first paragraph of Example 1 was reacted with 52.5 grams of phthalic anhydride under nitrogen at 130° C. for 30 minutes. The amber colored liquid polycaprolactone-epoxide adduct obtained had an RVT Brookfield viscosity of 1,030 poises at 25° C. using a No. 6 spindle at 5 rpm and an acid number of 57. This product was also water insoluble.

EXAMPLE 4

A 315 grams portion of the water insoluble reaction product produced in the first paragraph of Example 1 was reacted with 35 grams phthalic anhydride under an inert atmosphere at 130° C. for 30 minutes. The polycaprolactone-epoxide adduct produced was a water insoluble viscous liquid having an acid number of 40 and a Brookfield viscosity of 470 poises at 25° C.

A coating formulation was produced containing 20 grams of the above water insoluble product, 10 grams of hexamethoxymethylmelamine having about 1.5 weight percent methylol groups, 1.5 grams of dimethyl ethanolamine, 0.02 gram of Silicone Surfactant I and 25 grams of water. This water soluble coating was applied to steel panels and cured at 350° F. for 10 minutes to produce coatings with good flexibility, hardness, solvent resistance and adhesion.

EXAMPLE 5

A 380 grams portion of the reaction product of the first paragraph of Example 1 was reacted in an inert atmosphere with 20 grams of maleic anhydride at 130° C. for 5 minutes. The water insoluble polycaprolactone-epoxide adduct produced had an acid number of 28 and Brookfield viscosity of 277 poises at 25° C.

A clear water soluble coating was obtained using 10 grams of the water insoluble product produced above in admixture with 6.7 grams of water, 0.8 grams of dimethyl ethanolamine, 10 grams of hexamethoxymethylmelamine having about 1.5 weight percent methylol groups and 0.04 gram of Silicone Surfactant I. This coating composition, when applied and cured at elevated temperature, produced good films.

EXAMPLE 6

A mixture of 297.5 gram of Polyol B and 52.5 grams of phthalic anhydride was reacted under nitrogen at 130° C. for 30 minutes. At this time, 52.5 grams of 3,4-epoxycyclohexylmethyl-3,4-epoxycyclohexane carboxylate and 0.4 gram of stannous octoate were added and the mixture was heated for an additional 45 minutes at 130° C. The polycaprolactone-epoxide adduct produced was water insoluble and had an acid number of 37. Water soluble coating compositions were produced by the addition of 6.7 grams of water and 0.6 gram of dimethyl ethanolamine to 10 grams of the above water insoluble adduct.

EXAMPLE 7

A 360 grams portion of the polyol produced in the first paragraph of Example 1 was reacted under nitrogen with 40 grams of phthalic anhydride at 130° C. for 30 minutes. A water insoluble polycaprolactone-epoxide adduct was obtained having an acid number of 39. This was neutralized with 25 grams of morpholine to give a water soluble adduct.

A coating composition was prepared containing 165 grams of the water soluble polycaprolactone-epoxide adduct reaction mixture of this example, 150 grams of titanium dioxide, 45 grams of water, 135 grams of hexamethoxy-methylmelamine having about 5 weight percent methylol groups, 1.3 grams Silicone Surfactant I, 1 gram of the adduct of 10.5 moles of ethylene oxide and nonyl phenol.

EXAMPLE 8

A mixture of 140 grams of Polyol B, 140 grams of Polyol C and 60 grams of succinic anhydride was reacted under nitrogen at 140° C. for 5 minutes. To this reaction product mixture there were added 13.4 grams of polycaprolactone diol having an average molecular weight of 1,250 and an average hydroxyl value of 90, 66.6 grams of 3,4-epoxycyclohexylmethyl-3,4-epoxycyclohexane carboxylate, and 1 gram of stannous octoate. The polycaprolactone-epoxide adduct reaction mixture had an acid number of 40.5 and an oxirane content of 0.1 weight percent.

A 10 grams portion of the adduct described above was formulated with 10 grams of hexamethoxymethylmelamine having about 5 weight percent methylol group, 6.7 grams of water, 0.8 grams of dimethyl ethanolamine and 0.1 gram of Silicone Surfactant I to produce a water soluble clear coating composition. Films cast on steel panels and cured at 350° F. for 20 minutes gave coatings having good impact, hardness and adhesion properties.

What we claim is:

1. A water insoluble polycaprolactone-epoxide adduct comprising the reaction product mixture of a polycaprolactone polyol, a diepoxide and an anhydride of a polycarboxylic acid, said water insoluble polycaprolactone-epoxide adduct reaction product mixture produced by a process selected from the group consisting of Route 1 or Route 2, wherein Route 1 comprises the steps of
   (i) reacting a polycaprolactone polyol having at least two hydroxyl groups in the molecule, a hydroxyl number of from about 15 to about 600 and an average molecular weight of from 290 to about 6000 with a diepoxide to produce a water insoluble polycaprolactone-epoxide intermediate, and then
   (ii) reacting the intermediate of (i) with an intramolecular anhydride of a polycarboxylic acid to produce said water insoluble polycaprolactone-epoxide adduct reaction product mixture,
   and wherein Route 2 comprises the steps of
   (i) reacting a polycaprolactone polyol having at least two hydroxyl groups in the molecule, a hydroxyl number of from about 15 to about 600 and an average molecular weight of from 290 to about 6000 with an intra-molecular anhydride of a polycarboxylic acid to produce a water insoluble polycaprolactone adduct intermediate, and then
   (ii) reacting the intermediate of (i) with a diepoxide to produce said water insoluble polycaprolactone-epoxide adduct reaction product mixture and wherein there is used from 0.1 to about 0.5 anhydride equivalent for each unreacted hydroxyl equivalent or group initially present in the polycaprolactone polyol or formed in the polycaprolactone-epoxide adduct.

2. A water insoluble polycaprolactone-epoxide adduct as claimed in claim 1, wherein said polycaprolactone polyol has from 2 to 6 hydroxyl groups.

3. A water insoluble polycaprolactone-epoxide adduct as claimed in claim 1, wherein said polycaprolactone polyol has from 2 to 4 hydroxyl groups.

4. A water insoluble polycaprolactone-epoxide adduct as claimed in claim 1, wherein said polycaprolactone polyol has an average molecular weight of from 290 to about 3,000.

5. A water insoluble polycaprolactone-epoxide adduct as claimed in claim 1, wherein said polycaprolactone polyol is a diol having an average molecular weight of from 290 to about 500.

6. A water insoluble polycaprolactone-epoxide adduct as claimed in claim 1, wherein said polycaprolactone polyol is a triol having an average molecular weight of from about 300 to about 1,000.

7. A water insoluble polycaprolactone-epoxide adduct as claimed in claim 1, wherein said polycaprolactone polyol is a mixture of polycaprolactone polyols.

8. A water insoluble polycaprolactone-epoxide adduct as claimed in claim 1, wherein said anhydride is phthalic anhydride.

9. A water insoluble polycaprolactone-epoxide adduct as claimed in claim 1, wherein said anhydride is maleic anhydride.

10. A water insoluble polycaprolactone-epoxide adduct as claimed in claim 1, wherein said diepoxide is 3,4-epoxycyclohexylmethyl-3,4-epoxycyclohexane carboxylate.

11. A water insoluble polycaprolactone-epoxide adduct as claimed in claim 1, wherein from 0.2 to 1 mole of diepoxide is charged per mole of polycaprolactone polyol initially charged and reacted.

12. A water insoluble polycaprolactone-epoxide adduct as claimed in claim 1, wherein from 0.3 to 0.6 mole of diepoxide is charged per mole of polycaprolactone polyol initially charged and reacted.

13. A water insoluble polycaprolactone-epoxide adduct as claimed in claim 1, wherein said polycaprolactone polyol is a polycaprolactone triol having an average molecular weight of 300 and an average hydroxyl number of 560, said diepoxide is 3,4-epoxycyclohexylmethyl-3,4-epoxycyclohexane carboxylate and said anhydride is phthalic anhydride.

14. A water insoluble polycaprolactone-epoxide adduct as claimed in claim 1, wherein said polycaprolactone polyol is a polycaprolactone triol having an average molecular weight of 300 and an average hydroxyl number of 560, said diepoxide is 3,4-epoxycyclohexylmethyl-3,4-epoxycyclohexane carboxylate and said anhydride is maleic anhydride.

15. A water insoluble polycaprolactone-epoxide adduct as claimed in claim 1, wherein said polycaprolactone polyol is a polycaprolactone triol having an average molecular weight of 540 and an average hydroxyl number of 310, said diepoxide is 3,4-epoxycyclohexylmethyl-3,4-epoxycyclohexane carboxylate and said anhydride is phthalic anhydride.

16. A water insoluble polycaprolactone-epoxide adduct as claimed in claim 1, wherein said polycaprolactone polyol is a mixture of a polycaprolactone triol having an average molecular weight of 540 and an average hydroxyl number of 310 and a polycaprolactone triol having an average molecular weight of 300 and an average hydroxyl number of 560, said diepoxide is 3,4-epoxycyclohexylmethyl-3,4-epoxycyclohexane carboxylate and said anhydride is succinic anhydride.

17. A water soluble polycaprolactone-epoxide adduct comprising the adduct reaction product mixture of a polycaprolactone polyol, a diepoxide and an anhydride of a polycarboxylic acid, said water soluble polycaprolactone-epoxide adduct reaction product mixture produced by a process selected from the group consisting of Route 1 or Route 2, wherein Route 1 comprises the steps of
 (i) reacting a polycaprolactone polyol having at least two hydroxyl groups in the molecule, a hydroxyl number of from about 15 to about 600 and an average molecular weight of from 290 to about 6000 with a diepoxide to produce a water insoluble polycaprolactone-epoxide intermediate, then
 (ii) reacting the intermediate of (i) with an intramolecular anhydride of polycarboxylic acid to produce a second water insoluble polycaprolactone-epoxide adduct intermediate and then
 (iii) reacting the second intermediate of (ii) with an inorganic or organic base in an amount sufficient to neutralize the free carboxyl groups of the intermediate of (ii) to produce said water soluble polycaprolactone-epoxide adduct reaction product mixture,
and wherein Route 2 comprises the steps of
 (i) reacting a polycaprolactone polyol having at least two hydroxyl groups in the molecule, a hydroxyl number of from about 15 to about 600 and an average molecular weight of from 290 to about 6000 with an intra-molecular anhydride of a polycarboxylic acid to produce a water insoluble polycaprolactone adduct intermediate, then
 (ii) reacting the intermediate of (i) with a diepoxide to produce a second water insoluble polycaprolactone-epoxide adduct intermediate, and then
 (iii) reacting the second intermediate of (ii) with an inorganic or organic base in an amount sufficient to neutralize the free carboxyl groups of the intermediate of (ii) to produce said water soluble polycaprolactone-epoxide adduct reaction product mixture and wherein there is used from 0.1 to about 0.5 anhydride equivalent for each unreacted hydroxyl equivalent or group initially present in the polycaprolactone polyol or formed in the polycaprolactone-epoxide adduct.

18. A water soluble polycaprolactone-epoxide adduct as claimed in claim 17, wherein said polycaprolactone polyol has from 2 to 6 hydroxyl groups, and said base is an organic base.

19. A water soluble polycaprolactone-epoxide adduct as claimed in claim 17, wherein said polycaprolactone polyol has from 6 to 4 hydroxyl groups, and said base is an organic base.

20. A water soluble polycaprolactone-epoxide adduct as claimed in claim 17, wherein said polycaprolactone polyol has an average molecular weight of from 290 to about 3,000, and said base is an organic base.

21. A water soluble polycaprolactone-epoxide adduct as claimed in claim 17, wherein said polycaprolactone polyol is a diol having an average molecular weight of from 290 to about 500, and said base is an organic base.

22. A water soluble polycaprolactone-epoxide adduct as claimed in claim 17, wherein said polycaprolactone polyol is a triol having an average molecular weight of from about 300 to about 1,000, and said base is an organic base.

23. A water soluble polycaprolactone-epoxide adduct as claimed in claim 17, wherein said polycaprolactone polyol is a mixture of polycaprolactone polyols, and said base is an organic base.

24. A water soluble polycaprolactone-epoxide as claimed in claim 17, wherein said anhydride is phthalic anhydride, and said base is an organic base.

25. A water soluble polycaprolactone-epoxide as claimed in claim 17, wherein said anhydride is maleic anhydride, and said base is an organic base.

26. A water soluble polycaprolactone-epoxide as claimed in claim 17, wherein said diepoxide is 3,4-epoxycyclohexylmethyl-3,4-epoxycyclohexane carboxylate, and said base is an organic base.

27. A water soluble polycaprolactone-epoxide as claimed in claim 17, wherein in said adduct reaction product from 0.2 to 1 mole of diepoxide is reacted per mole of polycaprolactone polyol initially charged, and said base is an organic base.

28. A water soluble polycaprolactone-epoxide as claimed in claim 17, wherein in said adduct reaction product from 0.3 to 0.6 mole of diepoxide is reacted per mole of polycaprolactone polyol initially charged, and said base is an organic base.

29. A water soluble polycaprolactone-epoxide as claimed in claim 17, wherein in said adduct reaction product from 0.2 to 1 mole of diepoxide is reacted per mole of polycaprolactone initially charged and from 0.1 to 0.5 carboxylic anhydride equivalent per unreacted hydroxyl equivalent in said polycaprolactone polyol are reacted and said base is an organic base.

30. A water soluble polycaprolactone-epoxide as claimed in claim 17, wherein in said adduct reaction product from 0.3 to 0.6 mole of diepoxide is reacted per mole of polycaprolactone initially charged and from 0.1 to 0.5 carboxylic anhydride equivalent per unreacted hydroxyl equivalent in said polycaprolactone polyol are reacted and said base is an organic base.

31. A water soluble polycaprolactone-epoxide as claimed in claim 17, wherein in said adduct reaction product said polycaprolactone polyol is a polycaprolactone triol having an average molecular weight of 300 and an average hydroxyl number of 560, said diepoxide is 3,4-epoxycyclohexylmethyl-3,4-epoxycyclohexane carboxylate and said anhydride is phthalic anhydride, and said base is N,N-dimethyl ethanolamine.

32. A water soluble polycaprolactone-epoxide as claimed in claim 17, wherein in said adduct reaction product said polycaprolactone polyol is a polycaprolactone triol having an average molecular weight of 300 and an average hydroxyl number of 560, and diepoxide is 3,4-epoxycyclohexylmethyl-3,4-epoxycyclohexane carboxylate and said anhydride is maleic anhydride, and said base is N,N-dimethyl ethanolamine.

33. A water soluble polycaprolactone-epoxide as claimed in claim 17, wherein in said adduct reaction product said polycaprolactone polyol is a polycaprolactone triol having an average molecular weight of 540 and an average hydroxyl number of 310, and said base is N,N-dimethyl ethanolamine.

34. A water soluble polycaprolactone-epoxide as claimed in claim 17, wherein in said adduct reaction product said polycaprolactone polyol is a mixture of a polycaprolactone triol having an average molecular weight of 540 and an average hydroxyl number of 310 and a polycaprolactone triol having an average molecular weight of 300 and an average hydroxyl number of 560, said diepoxide is 3,4-epoxycyclohexylmethyl-3,4-epoxycyclohexane carboxylate and said anhydride is succinic anhydride, and said base is N,N-dimethyl ethanolamine.

35. A coating composition comprising a water soluble polycaprolactone-epoxide adduct as claimed in claim 17 and additionally containing from 25 to 200 weight percent of an amine crosslinking agent based on the weight of said water soluble adduct.

36. A coating composition comprising a water soluble polycaprolactone-epoxide adduct as claimed in claim 18 and additionally containing from 25 to 200 weight percent of an amine crosslinking agent based on the weight of said water soluble adduct.

37. A coating composition comprising a water soluble polycaprolactone-epoxide adduct as claimed in claim 19 and additionally containing from 25 to 200 weight percent of an amine crosslinking agent based on the weight of said water soluble adduct.

38. A coating composition comprising a water soluble polycaprolactone-epoxide adduct as claimed in claim 20 and additionally containing from 25 to 200 weight percent of an amine crosslinking agent based on the weight of said water soluble adduct.

39. A coating composition comprising a water soluble polycaprolactone-epoxide adduct as claimed in claim 21 and additionally containing from 25 to 200 weight percent of an amine crosslinking agent based on the weight of said water soluble adduct.

40. A coating composition comprising a water soluble polycaprolactone-epoxide adduct as claimed in claim 22 and additionally containing from 25 to 200 weight percent of an amine crosslinking agent based on the weight of said water soluble adduct.

41. A coating composition comprising a water soluble polycaprolactone-epoxide adduct as claimed in claim 23 and additionally containing from 25 to 200 weight percent of an amine crosslinking agent based on the weight of said water soluble adduct.

42. A coating composition comprising a water soluble polycaprolactone-epoxide adduct as claimed in claim 24 and additionally containing from 25 to 200 weight percent of an amine crosslinking agent based on the weight of said water soluble adduct.

43. A coating composition comprising a water soluble polycaprolactone-epoxide adduct as claimed in claim 25 and additionally containing from 25 to 200 weight percent of an amine crosslinking agent based on the weight of said water soluble adduct.

44. A coating composition comprising a water soluble polycaprolactone-epoxide adduct as claimed in claim 26 and additionally containing from 25 to 200 weight percent of an amine crosslinking agent based on the weight of said water soluble adduct.

45. A coating composition comprising a water soluble polycaprolactone-epoxide adduct as claimed in claim 27 and additionally containing from 25 to 200 weight percent of an amine crosslinking agent based on the weight of said water soluble adduct.

46. A coating composition comprising a water soluble polycaprolactone-epoxide adduct as claimed in claim 28 and additionally containing from 25 to 200 weight percent of an amine crosslinking agent based on the weight of said water soluble adduct.

47. A coating composition comprising a water soluble polycaprolactone-epoxide adduct as claimed in claim 29 and additionally containing from 25 to 200 weight percent of an amine crosslinking agent based on the weight of said water soluble adduct.

48. A coating composition comprising a water soluble polycaprolactone-epoxide adduct as claimed in claim 30 and additionally containing from 25 to 200 weight percent of an amine crosslinking agent based on the weight of said water soluble adduct.

49. A coating composition comprising a water soluble polycaprolactone-epoxide adduct as claimed in claim 31 and additionally containing from 25 to 200 weight percent of an amine crosslinking agent based on the weight of said water soluble adduct.

50. A coating composition comprising a water soluble polycaprolactone-epoxide adduct as claimed in claim 32 and additionally containing from 25 to 200 weight percent of an amine crosslinking agent based on the weight of said water soluble adduct.

51. A coating composition comprising a water soluble polycaprolactone-epoxide adduct as claimed in claim 33 and additionally containing from 25 to 200 weight percent of an amine crosslinking agent based on the weight of said water soluble adduct.

52. A coating composition comprising a water soluble polycaprolactone-epoxide adduct as claimed in claim 34 and additionally containing from 25 to 200 weight percent of an amine crosslinking agent based on the weight of said water soluble adduct.

53. A process for producing a water insoluble polycaprolactone-epoxide adduct reaction product mixture comprising the steps of
 (i) reacting a polycaprolactone polyol having at least two hydroxyl groups in the molecule, a hydroxyl number of from about 15 to about 600 and an average molecular weight of from 290 to about 6000 with an intramolecular anhydride of a polycarboxylic acid to produce a water insoluble polycaprolactone adduct intermediate, and
 (ii) reacting the intermediate of (i) with a diepoxide to produce said water insoluble polycaprolactone-epoxide adduct reaction product mixture.

54. A process as claimed in claim 53, wherein said water insoluble polycaprolactone-epoxide adduct reaction product mixture is reacted with an inorganic or organic base in an amount sufficient to neutralize the free carboxyl groups of said adduct reaction product mixture to produce a water soluble polycaprolactone-epoxide adduct reaction product mixture.

55. A process for producing a water insoluble polycaprolactone-epoxide adduct reaction product mixture comprising the steps of
 (i) reacting a polycaprolactone polyol having at least two hydroxyl groups in the molecule, a hydroxyl number of from about 15 to about 600 and an average molecular weight of from 290 to about 600 with a diepoxide to produce a water insoluble polycaprolactone-epoxide intermediate, and
 (ii) reacting the intermediate of (i) with an intramolecular anhydride of of polycarboxylic acid to produce a water insoluble polycaprolactone-epoxide adduct reaction product mixture.

56. A process as claimed in claim 55, wherein said water insoluble polycaprolactone-epoxide adduct reaction product mixture is reacted with an inorganic or organic base in an amount sufficient to neutralize the free carboxyl groups of said adduct reaction product mixture to produce a water soluble polycaprolactone-epoxide reaction product mixture.

* * * * *